US010872470B2

(12) United States Patent
VanBlon et al.

(10) Patent No.: US 10,872,470 B2
(45) Date of Patent: Dec. 22, 2020

(54) PRESENTATION OF CONTENT AT HEADSET DISPLAY BASED ON OTHER DISPLAY NOT BEING VIEWABLE (71) Applicant: Lenovo (Singapore) Pte. Ltd., Singapore (SG)

(72) Inventors: Russell Speight VanBlon, Raleigh, NC (US); John Carl Mese, Cary, NC (US); Nathan J. Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/946,242

(22) Filed: Apr. 5, 2018

(65) Prior Publication Data
US 2019/0311541 A1 Oct. 10, 2019

(51) Int. Cl.
*G06T 19/00* (2011.01)
*G06F 3/01* (2006.01)
*G02B 27/01* (2006.01)

(52) U.S. Cl.
CPC ........ *G06T 19/006* (2013.01); *G02B 27/0172* (2013.01); *G06F 3/012* (2013.01); *G02B 2027/014* (2013.01); *G02B 2027/0138* (2013.01)

(58) Field of Classification Search
CPC .... G06T 19/006; G02B 27/01; G02B 27/017; G02B 27/0172; G02B 27/0176
See application file for complete search history.

(56) References Cited

U.S. PATENT DOCUMENTS

| 9,875,075 B1 | 1/2018 | VanBlon et al. | |
|---|---|---|---|
| 2012/0206452 A1* | 8/2012 | Geisner | G02B 27/017 345/419 |
| 2012/0249741 A1* | 10/2012 | Maciocci | G06F 3/011 348/46 |
| 2013/0208014 A1* | 8/2013 | Fleck | G06K 9/00684 345/672 |
| 2013/0241948 A1* | 9/2013 | Kimura | G09G 5/006 345/589 |
| 2015/0220506 A1 | 8/2015 | Parkinson et al. | |
| 2015/0264529 A1 | 9/2015 | Cho | |
| 2016/0034245 A1 | 2/2016 | Karunakaran et al. | |
| 2016/0162082 A1* | 6/2016 | Schwesinger | G06F 3/167 345/173 |
| 2016/0292922 A1* | 10/2016 | Kasahara | G06F 3/1454 |

(Continued)

OTHER PUBLICATIONS

Russell Speight Vanblon, Arnold S. Weksler, Nathan J. Peterson, John Carl Mese, "Presentation of Content on a Video Display and a Headset Display", file history of related U.S. Appl. No. 15/218,694, filed Jul. 25, 2016.

(Continued)

*Primary Examiner* — Yuzhen Shen
(74) *Attorney, Agent, or Firm* — John M. Rogitz; John L. Rogitz (57) ABSTRACT

In one aspect, a headset includes a housing, a processor coupled to the housing, a first at least partially transparent display coupled to the housing and accessible to the processor, and storage coupled to the housing and accessible to the processor. The storage includes instructions executable by the processor to determine that a user cannot view at least a portion of a second display and, based on the determination, present at least a first portion of content on the first display.

20 Claims, 5 Drawing Sheets

(56) References Cited

U.S. PATENT DOCUMENTS

| | | |
|---|---|---|
| 2016/0350057 A1 | 12/2016 | Kwon et al. |
| 2017/0010849 A1 | 1/2017 | Deng et al. |
| 2017/0344124 A1* | 11/2017 | Douxchamps ........... B64G 1/10 |
| 2018/0075659 A1 | 3/2018 | Browy et al. |
| 2019/0011703 A1 | 1/2019 | Robaina et al. |
| 2019/0163963 A1 | 5/2019 | Minnick et al. |

OTHER PUBLICATIONS

Russell Speight Vanblon, Nathan J. Peterson, John Carl Mese, Presentation of Content on Headset Display Based on One or More Condition(s), file history of related U.S. Appl. No. 15/946,388, filed Apr. 5, 2018.

Vanblon et al., "Presentation of Content on Headset Display Based on One or More Condition(s)", related U.S. Appl. No. 15/946,388, Non-Final Office Action dated Feb. 27, 2020.

Vanblon et al., "Presentation of Content on Headset Display Based on One or More Condition(s)", related U.S. Appl. No. 15/946,388, Applicant's response to Non-Final Office Action filed Mar. 18, 2020.

Vanblon et al., "Presentation of Content on Headset Display Based on One or More Condition(s)", related U.S. Appl. No. 15/946,388, Non-Final Office Action dated Jul. 25, 2019.

Russell Speight Vanblon, Nathan J. Peterson, John Carl Mese, "Presentation of Content at Headset Display Based on One or More Conditions", related U.S. Appl. No. 15/946,388, Applicant's response to Non-Final Office Action filed Oct. 24, 2019.

Russell Speight Vanblon, Nathan J. Peterson, John Carl Mese, "Presentation of Content at Headset Display Based on One or More Conditions", related U.S. Appl. No. 15/946,388, Non-Final Office Action dated Aug. 3, 2020.

Russell Speight Vanblon, Nathan J. Peterson, John Carl Mese, "Presentation of Content at Headset Display Based on One or More Conditions", related U.S. Appl. No. 15/946,388, Final Office Action dated Apr. 17, 2020.

Russell Speight Vanblon, Nathan J. Peterson, John Carl Mese, "Presentation of Content at Headset Display Based on One or More Conditions", related U.S. Appl. No. 15/946,388, Applicant's response to Final Office Action filed Jul. 10, 2020.

* cited by examiner

PRESENTATION OF CONTENT AT HEADSET DISPLAY BASED ON OTHER DISPLAY NOT BEING VIEWABLE

BACKGROUND

Wearable devices and other types of personal devices are becoming increasingly prevalent in society and they can provide users with information that might not otherwise be readily available. However, as recognized herein, viewing the display of such a device may present certain problems. For instance, a user's long shirt or coat sleeve might block the user's view of his or her smart watch and uncovering the smart watch's display can be annoying, inconvenient, and burdensome in a given situation. Also, if the user forgets to wear his or her smart watch, that person will not be able to view useful information that might otherwise be presented using the smart watch's display. There are currently no adequate solutions to the foregoing computer-related, technological problem.

SUMMARY

Accordingly, in one aspect a headset includes a housing, at least one processor coupled to the housing, a first at least partially transparent display coupled to the housing and accessible to the at least one processor, and storage coupled to the housing and accessible to the at least one processor. The storage includes instructions executable by the at least one processor to determine that a user cannot view at least a portion of a second display and, based on the determination, present at least a first portion of content on the first display.

In another aspect, a method includes determining that a user cannot view at least a first portion of content presented on a first display of a first device and presenting, based on the determining, at least the first portion of the content on a second display of a headset.

In still another aspect, a computer readable storage medium includes instructions executable by at least one processor to determine that at least a first portion of content cannot be viewed via a first display of a first device and, based on the determination, present at least the first portion of the content on a second display of a headset.

The details of present principles, both as to their structure and operation, can best be understood in reference to the accompanying drawings, in which like reference numerals refer to like parts, and in which:

DETAILED DESCRIPTION

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp, of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C #or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
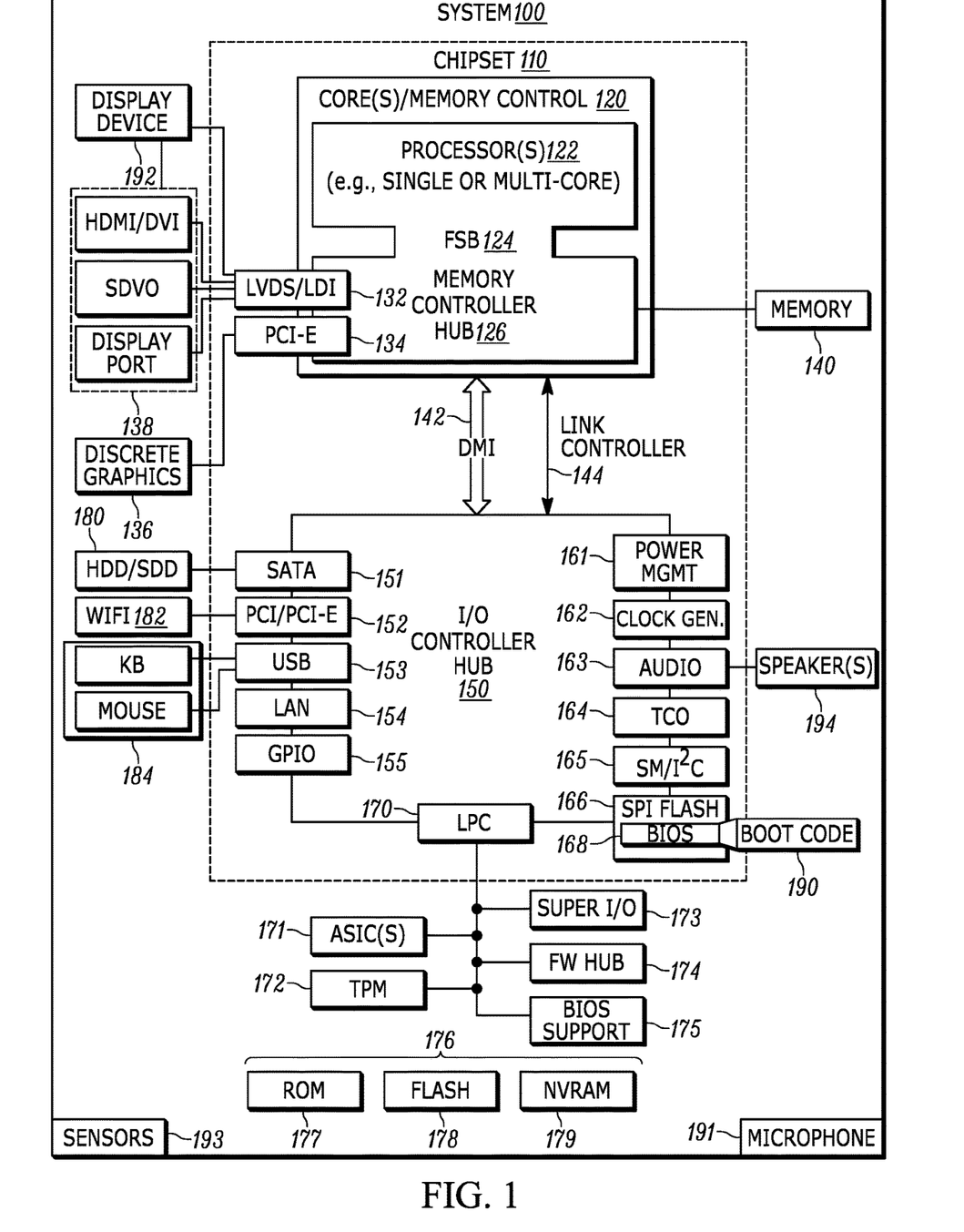
FIG. 1 is a block diagram of an example system in accordance with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140 For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (INDS) 132. The INDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more CPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-F interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include an audio receiver/microphone 191 that may provide input from the microphone to the processor 122 based on audio that is detected, such as via a user providing audible input to the microphone. The system may also include other sensors 193 such as an infrared (IR) proximity sensor, an inductive proximity sensor, a capacitive proximity sensor, a photoelectric proximity sensor, an ultrasound proximity sensor, etc. The sensor(s) 193 may also include a camera that may gather one or more images and provide them and related input to the processor 122. The camera may be a thermal imaging camera, a digital camera such as a webcam, a three-dimensional (3D) camera, an infrared (IR) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
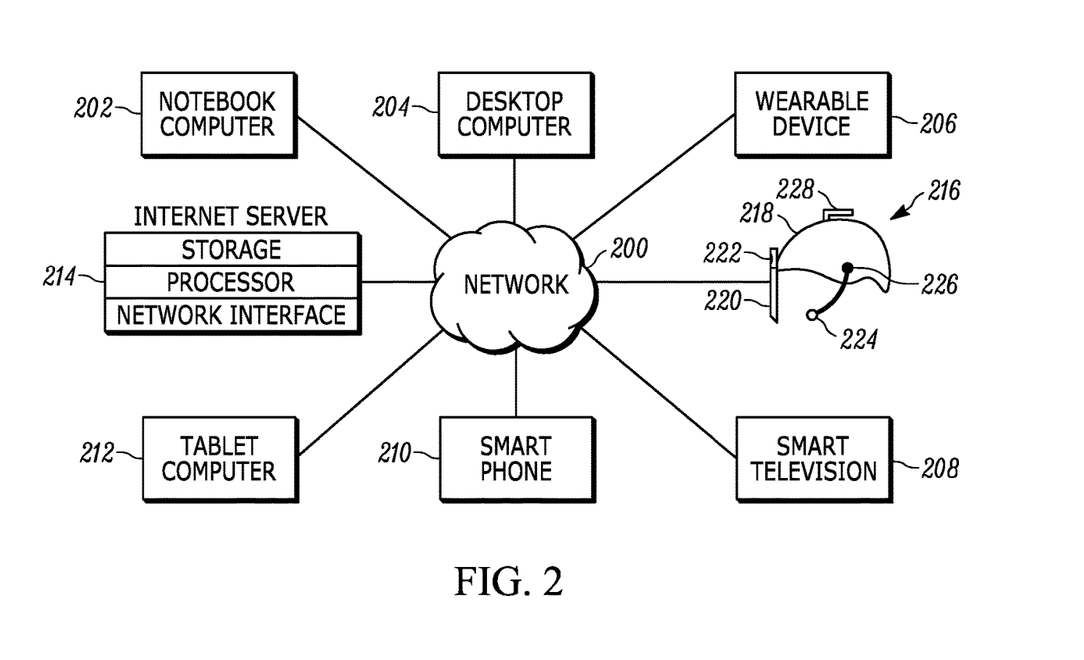
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212 and 216. It is to be understood that the devices 202-216 are configured to communicate with each other over the network 200 to undertake present principles.

Describing the headset 216 in more detail, it may be a virtual reality (VR) headset in some examples, an augmented reality (AR) headset in other examples, an Internet-enabled computerized glasses in still other examples, etc. The headset 216 may include a housing 218 to which an at least partially transparent display 220 is coupled for presenting content in accordance with present principles. The at least partially transparent display 220 may be a heads-up display and may permit a wearer of the headset to view real-world objects through it while wearing the headset 216, while also being configured to present content on the display 220 itself such as images, web pages, documents, etc.

The headset 216 may also include plural cameras 222 that may each be similar in function and configuration to the camera 19:3 described above, with at least one of the cameras 222 oriented to image a wearer's eyes when wearing the headset 216 for eye tracking as described herein and another of the cameras 222 being oriented away from the headset 216 to image other objects and gestures of the wearer. The headset 216 may also include a microphone 224 that may be similar in function and configuration to the microphone 191, a speaker 226 that may be similar in function and configuration to the speaker(s) 194, and one or more head-engagement members 228 for a user to dispose the headset 216 on his or her head. Though not shown for clarity, it is to be understood that the headset 216 may also include a network interface for wired and/or wireless communication with the other devices of FIG. 2 such as via the Internet, a local area network (LAN), a Bluetooth network, etc.

Figure 3:
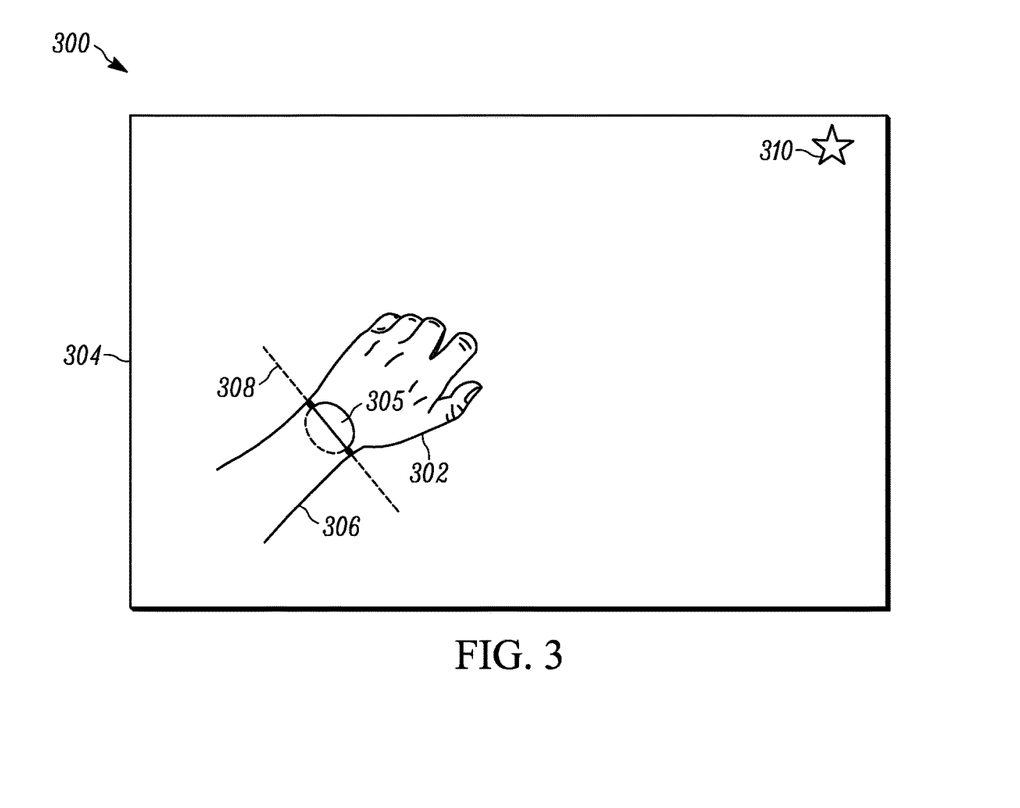
FIGS. 3 and 4 are example illustrations in accordance with present principles.

Referring to FIG. 3, it shows an example illustration 300 from the perspective of a user wearing a headset (such as the headset 216) in accordance with present principles. Additionally, a smart watch 302 that is being worn on the wrist of the user is shown as viewed through an at least partially transparent headset display 304, with the swatch 302 having a video display 305 as shown that is being partially obstructed from the user's view by the coat sleeve 306 of the user. Illustrative line 308 delineates that half of the display 305 of the smart watch 302 closest to the user's fingers is viewable as it is not obstructed by the coat sleeve 306, while the other half of the display 305 closest to the user's torso is obstructed from the user's view owing to the coat sleeve 306.

Because the user's sleeve 306 is blocking part of the display 305, augmented reality software may be used to present visual content, such as still images, video images, Internet websites, etc. on the display 304 that cannot be viewed on the obstructed half of the display 305 of the smart watch 302 that is closest to the user's torso. Moreover, the augmented reality software may be used to present the obstructed content using the display 304 so that it still appears to the user as though the obstructed content is presented using the display 305 within the boundaries of the display 305 as viewed by the user while wearing the headset. Thus, the visual content may appear uniform and/or continuous from the perspective of the user as though the content were presented on a single, unitary display even though it is really presented using both the display 304 and the display 305. Augmented reality software may be used for such purposes so that, regardless of the user moving his or her head from one position to another relative to the display 305, the visual content may appear unitary.

The content presented via the headset display 304 may be content that is already stored at the headset, content received from the smart watch 302, and/or content received from a third device that might be in communication with the headset and smart watch 302 such as a server. Moreover, note that which portions of content to present using the headset display 304 may be determined based on sensor input, as set forth further below in reference to FIGS. 5 and 6. Additionally, note that in addition to augmented reality software/processing, present principles may be implemented using other three-dimensional (3D) graphics rendering software such as virtual reality (VR) graphics rendering software.

Concluding the description of FIG. 3, also note that in some embodiments, an indication 310 may be presented using the display 304 to indicate that the display 304 is being used to present the visual content that is obstructed from view via the display 305.

Figure 4:
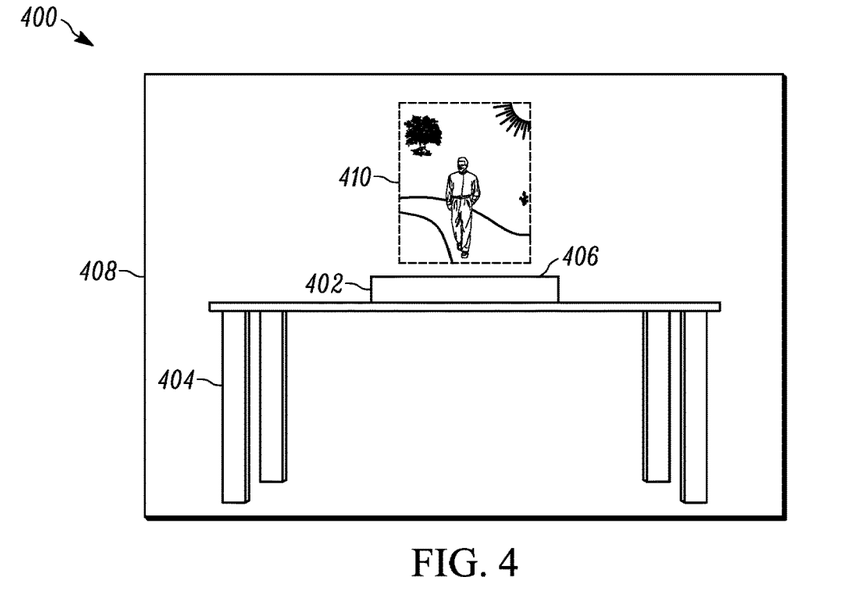

Reference is now made to FIG. 4, which shows another example illustration 400 from the perspective of a user wearing a headset in accordance with present principles. A smart phone 402 is shown laying on a table 404 with its video display 406 facing up from the top surface of the table so that no content presented on the display 406 can be viewed by the user from the user's current position relative to the display 406 as shown.

Also, note that as in FIG. 3, the user is viewing his or her surroundings through an at least partially transparent headset display 408. But differentiating from FIG. 3, since none of the display 406 is viewable by the user from his or her current perspective, augmented reality software may be used to present content 410 on the display 408 so that it appears to be in a plane facing the user and orthogonal to the display 406. In doing so, the content may appear as though presented on a virtual display located at the same depth, relative to the user, as the device 402 and hovering over the device 402 at a real-world geographic location that is a threshold non-zero distance above the display 406 (e.g., two inches) and hence distanced from the user.

Figure 5:
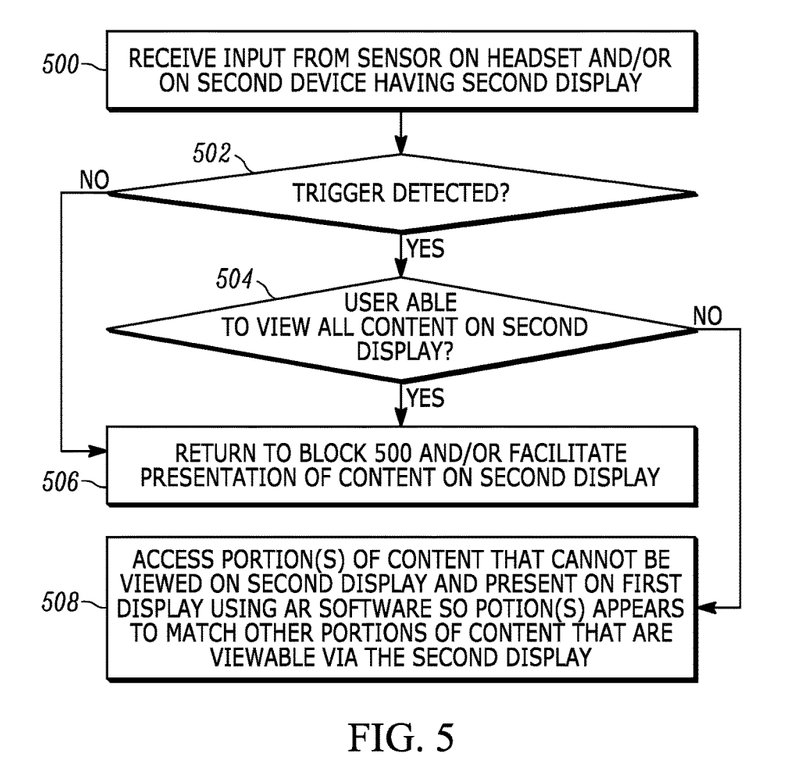
FIGS. 5 and 6 are flow charts of example algorithms in accordance with present principles.

With the foregoing in mind, reference is now to FIG. 5. It shows example logic that may be executed by a device such as the system 100 and/or a wearable headset such as the headset 216 in accordance with present principles. Beginning at block 500, the headset may receive input from at least one sensor on the headset or another device in communication with the headset, such as a smart watch or smart phone. The input may be, for example, one or more of input from a microphone, input from a camera, input from a proximity sensor, input from a touch-enabled display, input from a motion sensor such as a gyroscope or accelerometer, etc.

The logic of FIG. 5 may then proceed to decision diamond 502. At diamond 502 the headset may determine, based on the sensor input received at block 500, if a trigger has been detected. The trigger may be used as a cue for another device such as a smart watch to, e.g., illuminate its display if the display was previously off so that the smart watch display may present information. As an example, if the smart watch detects a predetermined wrist gesture, using a gyroscope and/or accelerometer in the smart watch, that is indicative of the face of the display being turned upward toward a user, the smart watch may illuminate its display to present the current time of day and also transmit a communication to the headset that this trigger (the predetermined gesture) has been detected. Thus, in some embodiments receipt of the communication by the headset may lead to an affirmative determination at diamond 502. Other examples of triggers being detected include recognition of a verbal command to illuminate the smart watch's display or the display of another device besides the headset as might be detected using microphone input and voice recognition software, as well as a button press directed to a power button of such a device that the device detects as a command to illuminate its display.

A negative determination at diamond 502 may cause the logic to proceed to block 506. At block 506 the headset may return to block 500 and proceed therefrom, and/or the headset may facilitate presentation of content on a display of the other device with which the headset is in communication. The display of the other device will be referenced below when describing the rest of FIG. 5 as the "second display", with the "first display" referenced below being understood to be the display on the headset itself. In any case, facilitating presentation of content on the second display may include streaming video or other content to the other device so that the other device may present it via the second display. For example, videos, text messages, pictures, Internet websites, etc. may be accessed by the headset over the Internet and then provided to the other device via a Bluetooth or Wi-Fi connection.

Notwithstanding the foregoing, also note that facilitating presentation of content may include still other things such as providing data indicating a storage location of content that the other device may then use to access content at the storage location or providing updates on the current time of day so that the other device may present the time of day via its display.

Referring back to decision diamond 502 again, note that if an affirmative determination is made instead, the logic may proceed to decision diamond 504. At diamond 504 the headset may determine whether a user is able to view all content that is or would be presented within the boundaries of the second display that is configured for presenting content (e.g., not including "dead space" of the display that might be black or opaque and surround the portion that is configured for presenting content).

The determination at diamond 504 may be made based on sensor input received at block 500. For example, based on Bluetooth or other wireless communication of input to the headset from one or more IR proximity sensors on the face of the other device that are arranged outside the boundary of the second display, the headset may determine that an object (e.g., coat sleeve) is within a threshold non-zero distance to the display (e.g., one inch), which may result in a negative determination diamond 504. As another example, based on wireless communication of input from a capacitance touch sensor incorporated into the second display or another portion of the other device, the headset may determine that an object s hovering within the threshold non-zero distance to the display, which may also result in a negative determination at diamond 504. As yet another example, based on input from a microphone on the headset (or the other device) and execution of voice recognition software to process the microphone input, the headset may determine that the user has said something about not being able to view all or part of the second display, resulting in a negative determination at diamond 504.

A negative determination at diamond 504 may be made in still other ways. As another example, based on input from a camera on the headset (or the other device) and execution of object recognition software, the headset may determine that all or part of the second display is obstructed from view either generally from multiple angles or specifically based on an identified line of sight for the user from the headset to the second display. For line of sight, the headset may assume that the line of sight for its camera is the same as the user's line of sight while wearing the headset, or the headset may determine the user's actual line of sight using eye tracking and/or by accounting for the difference in location of the user's eyes relative to the location of the camera.

Additionally, if the camera from which the input was received were on the other device, in addition to or in lieu of line of sight, the input may be used to determine that there is a piece of cloth or fabric blocking the camera or disposed over the camera and hence disposed over the other device itself to thus block the second display from being viewed by the user. For example, a determination may be made that a piece of cloth is disposed a threshold distance of half an inch or less over the camera, as determined using spatial analysis software.

Note that while many of the examples above have been described as involving determinations made by the headset, in addition to or in lieu of that, the sensor input may be received at the other device and the determinations may be made at the other device regardless of if the sensor from which the input was received is on the headset or other device. In these scenarios, the other device may then communicate with the headset to provide an indication that content presented on the second display cannot currently be viewed by the user/wearer of the headset. Receipt and recognition of such an indication by the headset may then also result in a negative determination at diamond 504.

Still describing FIG. 5, note that one or more of the conditions above not being identified may result in an affirmative determination at diamond 504. Put another way, a determination that the user is able to view all of the content presented on the second display or view all of the face of the second display itself may result in an affirmative determination. Responsive to an affirmative determination at diamond 504, the logic may move to block 506 and proceed therefrom as described above. But responsive to a negative determination at diamond 504, the logic may instead proceed to block 508.

At block 508 the headset may access one or more portions of content that cannot be viewed on the second display and may present those portions on the first display of the headset itself. In doing so, the headset may use augmented reality software or virtual reality software to employ image registration and generate stereoscopic images of the content to portray the content presented on the first display as though it is really presented on the second display. GPS coordinates that are wirelessly communicated to the headset by the other device, as well as triangulation of the other device using input from multiple cameras on the headset, might also be used for generation of the augmented reality images giving the impression of the content being presented on the second display rather than the first display. Thus, in matching with the second display, the visual content may appear to the user of the headset, while wearing the headset and looking through the first display, as though the content were unitary and cohesive as might be presented on a single display even though it is really presented using both the first and second displays.

The content itself that is accessed by the headset at block 508 may be content accessed from a storage location accessible to both the headset and other device so that the two of them may both access the content to present all or part of it on their respective displays. The storage location may be on the headset, on the other device, or on a third device such as a server.

Moreover, the headset may identify, e.g., horizontal or vertical portions of frames of the content to present on the first display to match with frames of the content presented on the second display by comparing image frames for the content as accessed by the headset to the one or more portions of the content recognized, using input from one or more cameras on the headset, as being presented on the other device and viewable from the field of view of the user. Again, the headset may assume that the field of view for the camera is the same as the user's field of view while wearing the headset, or may determine the user's actual field of view by using eye tracking and/or accounting for the difference in location of the user's eyes relative to the location of the camera. Additionally, or alternatively, X-Y coordinates for portions of the second display that are currently covered up by a shirt sleeve or other object may be communicated by the other device to the headset once identified by the other device using its proximity sensor(s). Once those coordinates are received, the headset may determine specific portions of the content to present using the first display as being portions of the content that would be or are presented at the coordinates of the second display that are obstructed from view.

Still other ways of determining portions of content to present using the first display may be used. Additionally, in embodiments such as the one described in reference to FIG. 4 where none of the second display on the other device might be viewable (such as if the device is laying face-up on a table or is in the user's pocket), the headset may determine that all of each frame of the content should be presented using the first display and do so as described above.

Figure 6:
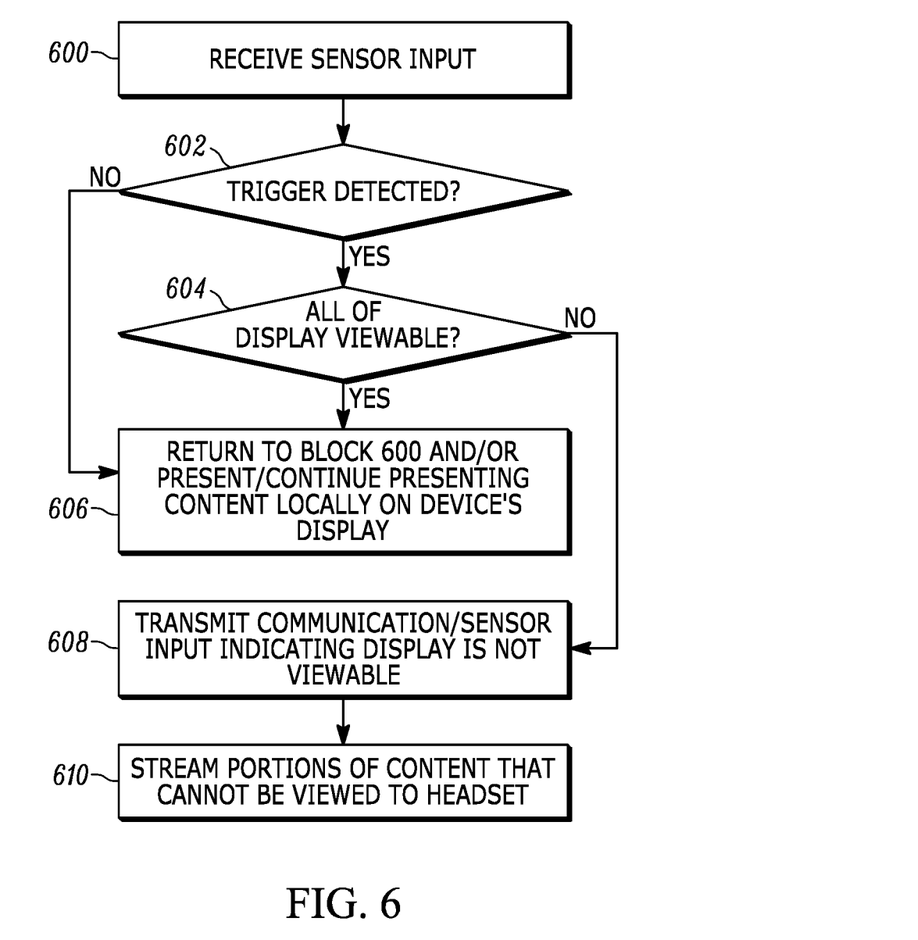

Now in reference to FIG. 6, it shows example logic that may be executed by the other device described above in reference to FIG. 5 that might be in communication with the headset. The logic of FIG. 6 may thus be executed in whole or in part in conjunction with the headset depending on a given embodiment.

Beginning at block 600, the device may receive sensor input as described herein. From block 600 the logic may proceed to decision diamond 602 where the device may determine if a trigger has been detected as also described herein. A negative determination at diamond 602 may cause the logic to proceed to block 606 where the logic may return to block 600 and proceed therefrom, and/or where the device may present or continue to present content locally on the device's own display (e.g., on the second display described in reference to FIG. 5 above).

However, an affirmative determination at diamond 602 may instead cause the logic to proceed to decision diamond 604. At diamond 604 the device may determine whether all of its display/the content it is presenting is viewable as described herein. For example, input from proximity sensors on the device as might be received at block 600 may be used to determine whether all of its display/the content it is presenting is viewable.

An affirmative determination at diamond 604 may cause the logic to move to block 606 and proceed therefrom as described above. However, a negative determination at diamond 604 may instead cause the logic to proceed to block 608. At block 608 the device may transmit a message to the headset and/or transmit the sensor input received at block 600 to the headset, with the message or input indicating portions of the device's display that are not currently viewable to the headset user. From block 608 the logic may then proceed to block 610 where the device may, if the content being presented on the device's display is stored on or accessed through the device, stream at least the portions of the content that cannot be viewed to the headset for presentation on the headset's display. For example, segments of frames of the content that do not include the entirety of the respective frames of the content may be streamed to the headset.

Figure 7:
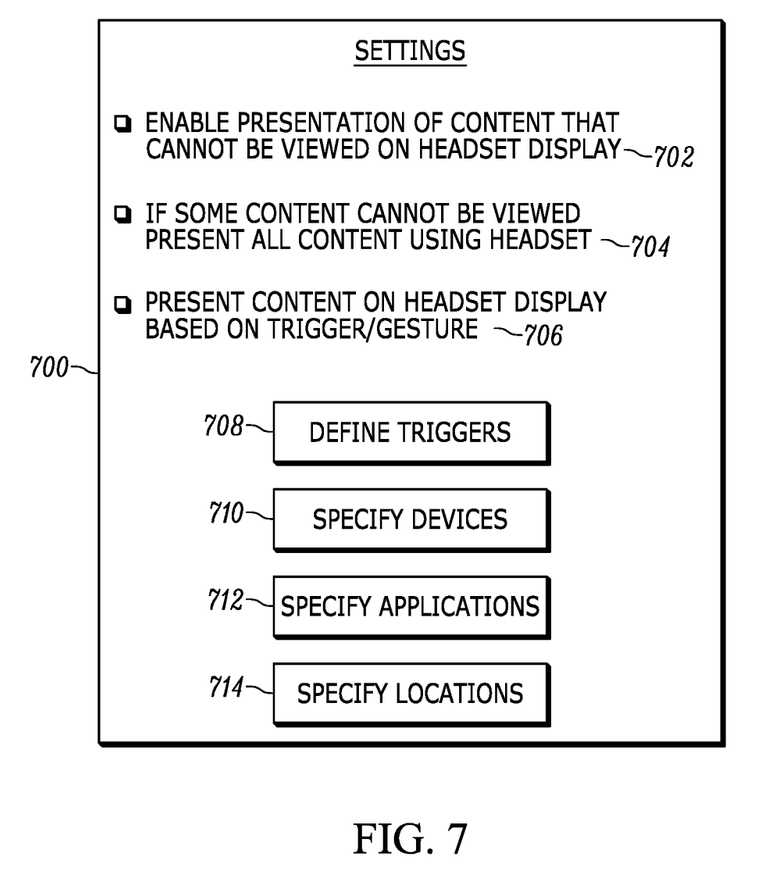
FIG. 7 is an example user interface (UI) in accordance with present principles.

Continuing the detailed description in reference to FIG. 7, it shows an example graphical user interface (GUI) 700 for configuring settings of a device or application undertaking present principles, such as an application for undertaking present principles as executed at the headset or other device described above in reference to FIGS. 5 and 6. The GUI 700 may be presented on the display of the headset, the display of the other device, or even the display of still another device in communication with one or both of the other two. Each of the options to be discussed below may be respectively selected by a user by directing touch or cursor input to an adjacent area of the GUI 700 presenting a respective check box for the option to select the respective check box.

The GUI 700 may include a first option 702 selectable to enable the headset and/or other device to undertake present principles to present content using the displays of both devices. For instance, selection of the option 702 may configure the headset to undertake the logic described above in reference to FIG. 5.

The GUI 700 may include a second option 704 that may be selectable to enable the device/headset to, upon determining that at least part of content that is being presented cannot be viewed, present all frames of the content on the headset's display. The GUI 700 may also include a third option 706 that is selectable to enable presentation of content on the headset's display as described herein responsive to detecting a trigger (e.g., predetermined gesture).

FIG. 7 also shows that the GUI 700 may include a selector 708 that is selectable based on touch or cursor input to initiate an interactive process at the headset or other device (using a series of GUIs, for example) through which the user may define one or more triggers for subsequent detection in accordance with present principles. A selector 710 may also be presented that is selectable to initiate an interactive process at the headset or other device through which the user may define one or more specific devices other than the headset) for which to make determinations regarding whether content presented on displays of those devices can be viewed. Again, one or more GUIs may be used for that interactive process as well.

Moreover, the GUI 700 may include a selector 712 that is selectable to initiate an interactive process at the headset or other device through which the user may define one or more specific software applications for which to make determinations regarding whether content can be viewed. Thus, for example, the logic of FIGS. 5 and/or 6 might be executed when content is presented at the other device using one application but not when content is presented at the other device using a different application. Again, one or more GUIs may be used for that interactive process.

Still further, the GUI 700 may include a selector 714 that is selectable to initiate an interactive process at the headset or other device through which the user may define one or more specific geographic locations at which determinations regarding whether content can be viewed should be made. Thus, for example, the logic of FIGS. 5 and/or 6 might be executed when content is presented while the user and devices are located at home but not when the user and devices are at a different location such as the user's office. Again, one or more GUIs may be used for that interactive process, and UPS coordinates from a GPS transceiver on one or both devices may be used for determining the geographic locations themselves.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A headset, comprising:
a housing;
at least one processor coupled to the housing;
a first, at least partially transparent display coupled to the housing and accessible to the at least one processor; and
storage coupled to the housing and accessible to the at least one processor, the storage comprising instructions executable by the at least one processor to:
determine that a user cannot view at least a portion of a second display; and
based on the determination, present at least a first portion of content on the first display for the first portion of the content to appear as though it is presented on the second display beside but not overlapping a second portion of the content that is being presented on the second display and that is viewable by the user through the first display while the first portion of the content is presented on the first display, the second portion of the content being viewable through the first display while the first portion of the content is presented on the first display, the first portion of the content being related to but not the same as the second portion of the content;
wherein at least the first portion of the content is received at the headset for presentation on the first display, the at least first portion of the content being received from a second device that comprises the second display.

2. The headset of claim 1, wherein the first portion of the content would be viewable via the second display if the user were able to view at least the portion of the second display.

3. The headset of claim 1, wherein the instructions are executable by the at least one processor to:
use augmented reality software to present at least the first portion of the content on the first display.

4. The headset of claim 1, wherein the instructions are executable by the at least one processor to:
determine, based on a communication from the second device that comprises the second display, that the user cannot view at least the portion of the second display.

5. The headset of claim 4, wherein the communication indicates that at least the portion of the second display cannot be viewed.

6. The headset of claim 1, comprising at least one sensor coupled to the housing and accessible to the at least one processor, and wherein the instructions are executable by the at least one processor to:
receive input from the at least one sensor; and
based at least in part on the input from the at least one sensor, determine that the user cannot view at least the portion of the second display;
wherein the at least one sensor comprises a microphone, wherein the input is received from the microphone, and wherein the input indicates that the user has said something about not being able to view all or part of the second display.

7. The headset of claim 1, wherein the instructions are executable to:
present, on one or more of the first display and the second display, a graphical user interface (GUI), the GUI comprising an option that is selectable to set the headset to perform determinations that at least a portion of the second display cannot be viewed and to present contents on the first display to appear as though presented on the second display based on the determinations.

8. The headset of claim 7, wherein the GUI comprises a selector that is selectable to select different software applications that are usable to present different contents for which the determinations will be made.

9. A method, comprising:
determining that a user cannot view at least a first portion of content presented on a first display of a first device; and
presenting, based on the determining, at least the first portion of the content on a second display of a headset so that the first portion appears to be presented on a virtual display in a plane facing the user and orthogonal to a plane of the first display corresponding to a surface of the first display at which the content as presented on the first display can be viewed, the virtual display appearing as though located at the same depth, relative to the user, as the first device and appearing as though hovering over the first device at a real-world geographic location that is above the first display and distanced from the user, the headset being different from the first device and being different from the object, both the first device and the headset being tangible devices, the first display being different from the second display but both of the first and second displays still being tangible.

10. The method of claim 9, comprising:
determining that the user cannot view at least the first portion of the content presented on the first display based at least in part on communication with the first device that indicates that at least the first portion of the content is not viewable to the user.

11. The method of claim 9, comprising:
receiving input from at least one camera; and
determining, based on the input from the at least one camera, that the user cannot view at least the first portion of the content presented on the first display;
wherein receiving the input from the at least one camera comprises receiving the input from a first camera on the first device.

12. The method of claim 9, comprising:
presenting at least the first portion of content on the second display of the headset using augmented reality software.

13. The method of claim 9, comprising:
receiving data pertaining to a predetermined gesture being performed; and
determining, based at least in part on receiving the data pertaining to the predetermined gesture being performed, that the user cannot view at least the first portion of the content presented on the first display.

14. The method of claim 9, wherein the first portion of the content is presented on the virtual display so that the virtual display appears as though hovering a threshold non-zero distance above the first display.

15. The method of claim 9, wherein the determining that the user cannot view at least the first portion of content presented on the first display is based on the first device lying on a horizontal surface.

16. At least one computer readable storage medium (CRSM) that is not a transitory signal, the at least one computer readable storage medium comprising instructions executable by at least one processor to:
determine that at least a first portion of an image for a particular piece of content cannot be viewed via a first display of a first device; and
present, based on the determination, at least the first portion on a second display of a headset, the first portion being received from the first device, the headset being different from the first device but both being tangible devices, the second display being at least partially transparent so that a person can both view content presented using the second display and also look through the second display to view real-world surroundings, the first portion being different from the second portion.

17. The at least one CRSM of claim 16, wherein the determination is performed based at least in part on input from an infrared (IR) proximity sensor that is indicative of the first portion not being viewable via the first display.

18. The at least one CRSM of claim 16, wherein the determination is performed based at least in part on input from a microphone that is indicative of the first portion not being viewable via the first display.

19. The at least one CRSM of claim 16, wherein the instructions are executable to:
present at least the first portion on the second display so that the first portion appears to be presented on a virtual display different from the first and second displays, the virtual display appearing as though located at the same depth, relative to the user, as the first device and appearing as though hovering over the first device at a real-world geographic location that is above the first device, the first display being different from the second display but both of the first and second displays still being tangible.

20. The at least one CRSM of claim 16, wherein the instructions are executable to:
present, on one or more of the first display and the second display, a graphical user interface (GUI), the GUI comprising an option that is selectable to set the headset to perform determinations that at least a portion of the first display cannot be viewed and to present contents on the second display to appear as though presented on the first display based on the determinations.

* * * * *